United States Patent
Prezecki

(10) Patent No.: US 10,308,066 B2
(45) Date of Patent: Jun. 4, 2019

(54) SPACE-SAVING SPARE WHEEL ASSEMBLY HAVING ERGONOMIC HANDLES FOR USE WITH A VEHICLE

(71) Applicant: Ford Global Technologies, LLC, Dearborn, MI (US)

(72) Inventor: Leonard Gus Prezecki, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/276,956

(22) Filed: Sep. 27, 2016

(65) Prior Publication Data

US 2018/0086135 A1    Mar. 29, 2018

(51) Int. Cl.
| | | |
|---|---|---|
| *B60B 3/00* | (2006.01) | |
| *B60B 3/02* | (2006.01) | |
| *B60B 21/00* | (2006.01) | |
| *B60B 29/00* | (2006.01) | |
| *B60B 30/08* | (2006.01) | |
| *B62D 43/10* | (2006.01) | |

(52) U.S. Cl.
CPC ............... *B60B 3/007* (2013.01); *B60B 3/02* (2013.01); *B60B 21/00* (2013.01); *B60B 29/00* (2013.01); *B60B 30/08* (2013.01); *B60B 2900/114* (2013.01); *B60B 2900/531* (2013.01); *B60B 2900/541* (2013.01); *B60B 2900/731* (2013.01); *B62D 43/10* (2013.01)

(58) Field of Classification Search
CPC ......... B60B 3/004; B60B 3/007; B60B 3/008; B60B 3/10; B60B 3/02; B60B 30/08
See application file for complete search history.

(56) References Cited

U.S. PATENT DOCUMENTS

| | | | |
|---|---|---|---|
| 2,805,882 A | | 11/1953 | Bohenek |
| 3,649,976 A | | 3/1972 | Isom |
| D232,632 S | * | 9/1974 | Brown .................. D12/209 |
| D235,539 S | * | 6/1975 | Asberg .................. D12/206 |
| 4,106,681 A | | 8/1978 | Bott |
| 4,377,366 A | | 3/1983 | Hamlyn |
| 4,516,706 A | | 5/1985 | Niehaus |
| 4,533,169 A | | 8/1985 | Rauthmann et al. |
| D282,835 S | * | 3/1986 | Main .................... D12/209 |

(Continued)

FOREIGN PATENT DOCUMENTS

WO    2011098816    8/2011

*Primary Examiner* — Kip T Kotter
(74) *Attorney, Agent, or Firm* — LeClairRyan

(57) ABSTRACT

A spare wheel assembly comprising a tire and a rim to which the tire is attached is disclosed. The rim includes a center mounting plate having a center bore, inner and outer opposed flanges, and a disk between the center bore and the flanges. The disk includes a pair of elongated, curved slots formed on opposite sides of the center bore. Each of the slots is an ergonomically-formed hand hold for receiving fingers of an operator's hand. The inner and outer opposed flanges of the rim define perimeters of the rim between which the tire is held. The curved slots are concentric with respect to the perimeter of the outer flange and with respect to the center bore. A centerline is formed radially through the assembly. The disk is positioned on one side of the centerline and the mounting plate is positioned on the other side of the centerline.

20 Claims, 3 Drawing Sheets

(56) References Cited

U.S. PATENT DOCUMENTS

| | | | |
|---|---|---|---|
| 4,585,276 A * | 4/1986 | Tirheimer | B60B 11/06 301/128 |
| 4,606,582 A * | 8/1986 | Warren | B60B 7/068 301/108.4 |
| 4,645,267 A * | 2/1987 | Weld | B60B 1/0215 29/894.324 |
| 4,687,124 A | 8/1987 | Mahr | |
| 4,724,880 A * | 2/1988 | Voornas | B60C 29/02 116/34 R |
| D356,538 S * | 3/1995 | Botterman | D12/209 |
| 5,416,471 A | 5/1995 | Treharne et al. | |
| 5,466,050 A * | 11/1995 | Botterman | B21K 1/28 301/64.101 |
| 5,508,694 A | 4/1996 | Treharne et al. | |
| 5,954,246 A | 9/1999 | Golovoy et al. | |
| 6,007,158 A * | 12/1999 | Maloney | B60B 7/00 301/37.11 |
| RE36,505 E | 1/2000 | Treharne et al. | |
| 6,047,231 A | 4/2000 | Rodrigues et al. | |
| 6,073,347 A * | 6/2000 | Cvijanovic | B21D 53/26 29/894.322 |
| 6,293,630 B1 * | 9/2001 | Separautzki | B60B 3/002 301/64.203 |
| 6,427,885 B1 | 8/2002 | Dexel | |
| 6,457,780 B1 * | 10/2002 | Ernst | B60B 7/02 301/37.103 |
| 6,655,896 B2 | 12/2003 | Morin et al. | |
| 6,784,794 B1 | 8/2004 | McQuade et al. | |
| 6,850,155 B1 | 2/2005 | McQuade | |
| D502,908 S * | 3/2005 | Mahachanh | D12/209 |
| 6,985,076 B1 | 1/2006 | Bennie et al. | |
| 7,731,257 B2 | 6/2010 | Venuto et al. | |
| D662,021 S * | 6/2012 | Grossenbacher | D12/209 |
| 8,204,244 B2 | 6/2012 | Ludwig et al. | |
| 8,857,898 B1 | 10/2014 | Dubaisi et al. | |
| 9,266,564 B1 | 2/2016 | Arora et al. | |
| 9,278,585 B2 | 3/2016 | Rodgers et al. | |
| 9,315,160 B2 | 4/2016 | Xu et al. | |
| 2010/0127558 A1 * | 5/2010 | Trentin | B60B 3/002 301/6.91 |

\* cited by examiner

SPACE-SAVING SPARE WHEEL ASSEMBLY HAVING ERGONOMIC HANDLES FOR USE WITH A VEHICLE

TECHNICAL FIELD

The disclosed inventive concept relates generally to a spare wheel assembly for vehicles. More particularly, the disclosed inventive concept relates to a space-saving spare wheel assembly having ergonomic handles formed in the wheel rim. Each ergonomic handle is defined by a curved slot that permits insertion of the fingers of the operator's hand. Using both hands, the operator can readily remove the spare wheel assembly from the vehicle's spare wheel well and install the wheel on the vehicle's hub with a minimum amount of difficulty.

BACKGROUND OF THE INVENTION

A spare wheel assembly is an extra wheel assembly carried in a vehicle that can function as a replacement for a road wheel that is no longer capable of functioning. The spare wheel assembly may be carried in any of a number of locations on the vehicle, the most typical being in a spare wheel well formed in the trunk of the vehicle. A cover, such as a rigid piece of cardboard, is frequently positioned over the spare wheel well. A trunk carpet is often either placed over the floor of the trunk, thereby concealing the spare wheel assembly cover, or the outer surface of the spare wheel assembly cover is itself covered with a piece of carpet.

It has become more common in more recent years of automobile manufacturing to replace the traditional full-size spare wheel assembly with a space-saving mini-spare wheel assembly. Such tires are compact and, accordingly, take less space than required by full-size spare wheel assemblies. In addition, the mini-spare wheel assembly typically weighs less than a full-size spare wheel assembly. Accordingly, the mini-spare wheel assembly answers both the need for reduced space as well as the need for reduced overall weight.

The rim of the common mini-spare wheel assembly includes small holes typically punched in the rim. The holes are provided for brake heat clearance and to reduce overall weight. In the event that the mini-spare wheel assembly needs to be removed from the spare wheel well, it is necessary for the operator to either seize the mini-spare wheel assembly by the tire treads or by the lug openings or center hub opening formed in the rim. The former operation is difficult to accomplish because of the relative closeness of the outer surface of the tire to the walls of the spare wheel well. The latter operation is difficult to accomplish because the lug openings or center hub opening are not designed to allow for the insertion of the operator's fingers therein.

As in so many areas of vehicle technology there is always room for improvement related to spare wheel assembly designs for use with automotive vehicles.

SUMMARY OF THE INVENTION

The disclosed invention overcomes the problems of known spare wheel assemblies by providing a pair of spaced-apart ergonomic slots formed in the disk of the rim of the spare wheel assembly through which the fingers of the operator's hands may be inserted to easily lift the spare wheel from the spare wheel well for placement against the vehicle hub. The spare wheel assembly of the disclosed inventive concept thus provides for ease of removal and placement of the spare wheel assembly without the need for removal tools.

The spare wheel assembly according to the disclosed inventive concept includes a tire and a rim to which the tire is attached. The rim may be made of any one of several materials, including metals and plastics. For example, if a metal, the rim may be formed from stamped steel or may be formed from cast aluminum. If a plastic, the rim may be formed from a strong and light fiber-reinforced plastic such as a carbon fiber reinforced polymer, a carbon fiber reinforced plastic, or a carbon reinforced thermoplastic. The rim includes a center mounting plate having a center bore, inner and outer opposed flanges, and a disk formed between the center bore and the flanges. The disk includes a pair of elongated, curved slots formed on opposite sides of the center bore. Each of the slots is a hand hold for receiving fingers of an operator's hand. The slots are preferably formed by stamping.

The inner and outer opposed flanges of the rim define perimeters of the rim between which the tire is held. Each of the elongated, curved slots is formed adjacent the outer flange. The curved slots are spaced about an imaginary circle or circumference which is concentric with the perimeter of the outer flange and the center bore. As a result, the curved slots are equally spaced apart from the outer flange. Similarly, the curved slots are also equally spaced apart from the center bore.

A centerline is formed radially through the spare wheel assembly. The disk is positioned on one side of the centerline and the mounting plate is positioned on the other side of the centerline.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
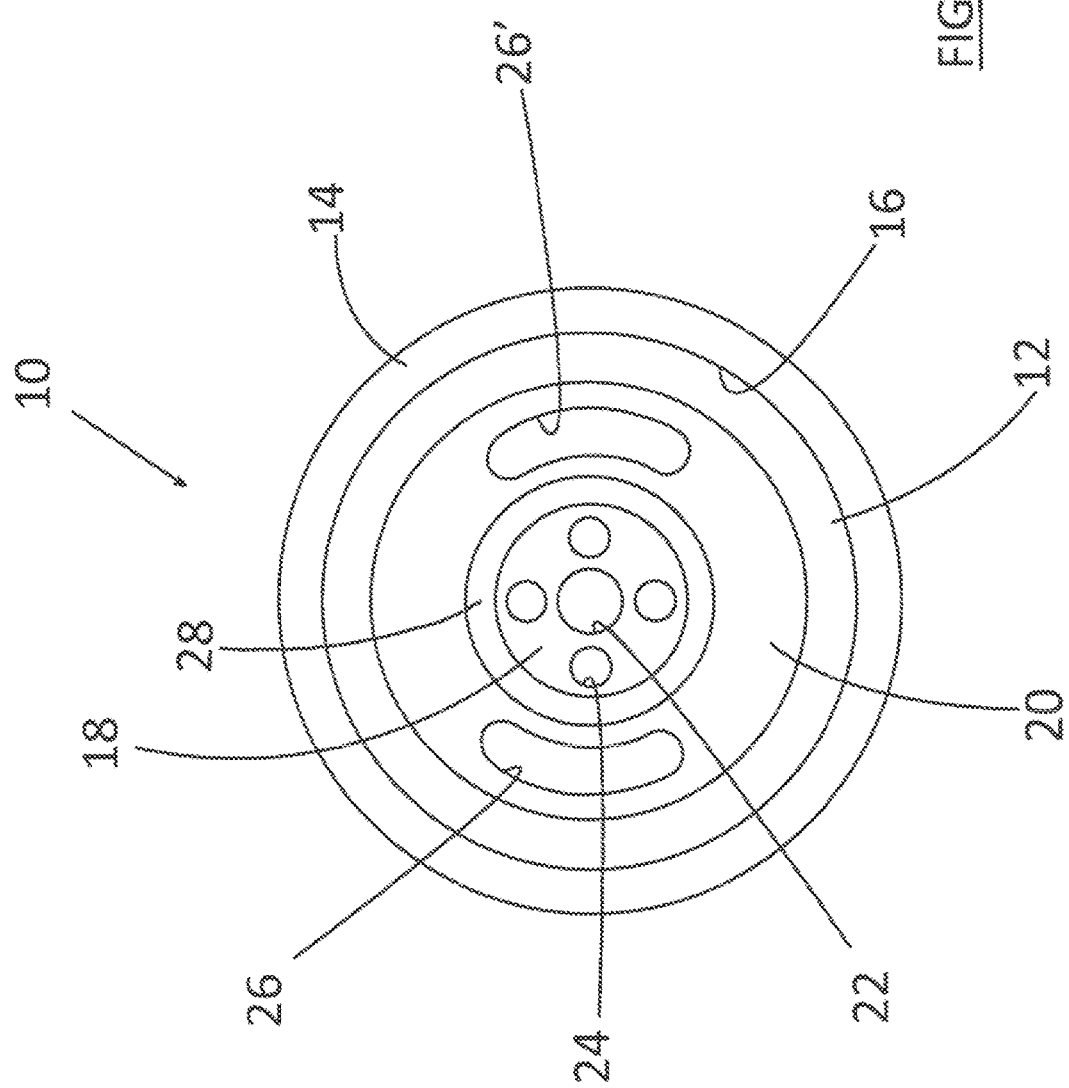
FIG. 1 is a plan view of a space-saving spare wheel assembly having formed ergonomic handles for use with a vehicle according to the disclosed inventive concept.

In the following figures, the same reference numerals will be used to refer to the same components. In the following description, various operating parameters and components are described for different constructed embodiments. These specific parameters and components are included as examples and are not meant to be limiting.

The figures illustrate a space-saving spare wheel assembly having formed ergonomic handles according to the disclosed inventive concept. It is to be understood that the illustrated embodiment is suggestive and is not intended as being limiting. For example, while only two ergonomic hand-receiving slots are illustrated it may be possible for three or more slots to be provided. In addition, while the illustrated wheel assembly is shown as being a spare wheel assembly, the present inventive concept could also be used as part of a road wheel assembly.

Referring to FIG. 1, a plan view of a space-saving spare wheel assembly having formed ergonomic handles for use with a vehicle according to the disclosed inventive concept is shown. The space-saving spare wheel assembly, generally illustrated as 10, includes a rim 12. (The rim 12 is occasionally referred to as the wheel.) A tire 14 is attached to the rim 12. The illustrated tire 14 is commonly known as a space-saving tire but it is to be understood that the tire 14 may alternatively be a conventional road tire as noted above. As noted above, the rim 12 may be made of any one of several materials including, without limitation, a metal, such as stamped steel or cast aluminum, or a plastic, such as any one of several carbon reinforced plastics.

The rim 12 includes an outer rim flange 16 which, together with an inner rim flange (shown in FIGS. 2 and 3 and discussed in conjunction therewith), captures the tire 14 therebetween. A hub mounting plate 18 is centrally positioned on the rim 12. A disk 20 is positioned between the outer rim flange 16 and the hub mounting plate 18. A center bore 22 is formed in the center of the hub mounting plate 18. In addition, a plurality of lug bolt holes 24 is formed in the hub mounting plate. It is to be understood that while four lug bolt holes 24 are illustrated, a greater or lesser number of lug bolt holes may be provided.

FIG. 1 also illustrates a pair of opposed elongated, curved handles 26 and 26' that are preferably formed by stamping. The curved handles 26 and 26' are positioned adjacent the outer rim flange 16 and between the outer rim flange 16 and the hub mounting plate 18. As shown, the curved handles 26 and 26' are preferably spaced about an imaginary circle or circumference which is concentric with the center bore 22 and the perimeter of the outer rim flange 16. As a result, the curved handles 26 and 26' are equally spaced apart from the outer rim flange 16. Similarly, the curved slots 26 and 26' are also equally spaced apart from the center bore 22. Throughout the ensuing description, all references to the curved handles 26 and 26' being concentric or spaced about an imaginary circle or circumference which is concentric with the center bore 22 and the outer rim flange 16 should be understood to mean that the curved handles 26 and 26' are equally spaced apart from the center bore 22 and the outer rim flange 16 with respect to one another. It is to be understood that the number, shape and placement of the curved handles 26 and 26' shown in FIG. 1 are preferred but are not intended as being limiting. For example, four curved handles may be provided of different sizes to accommodate hands of different sizes. Regardless of the preferred number, shape and placement of the curved handles 26 and 26', these variables are optimized so as to provide the greatest convenience to the operator when handling the space-saving spare wheel assembly 10. Between the curved handles 26 and 26' and the hub mounting plate 18 is provided a conical area 28. The conical area 28 provides the appropriate depth between the disk 20 and the hub mounting plate 18 as illustrated in FIGS. 2 and 3 and as discussed in relation thereto.

When not in use on a vehicle, the space-saving spare wheel assembly 10 of the disclosed inventive concept is typically though not exclusively stored in the vehicle's trunk. Such an arrangement is illustrated in FIG. 2 in which the space-saving spare wheel assembly 10 is illustrated in its stored position in a spare wheel well 30. It is to be understood that the space-saving spare wheel assembly 10 may be stored instead on, for example, a spare wheel support bracket fitted to the outside of the rear end of the vehicle.

Figure 2:
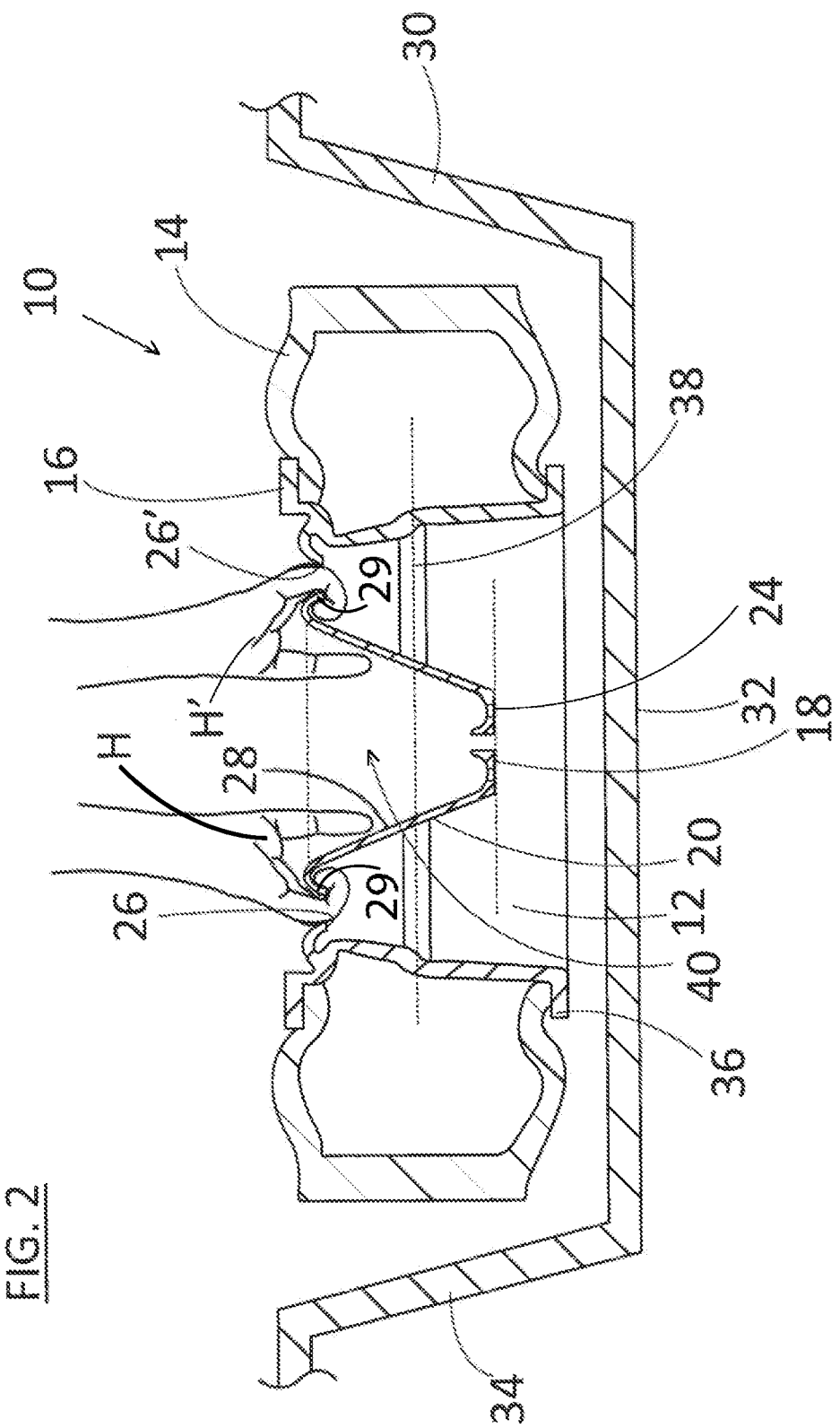
FIG. 2 is a sectional view of the space-saving spare wheel assembly of the disclosed inventive concept as illustrated in FIG. 1 shown in spaced-apart relation to the spare wheel well of a vehicle as would be the case when the wheel is being positioned in the well or removed therefrom.
Figure 3:
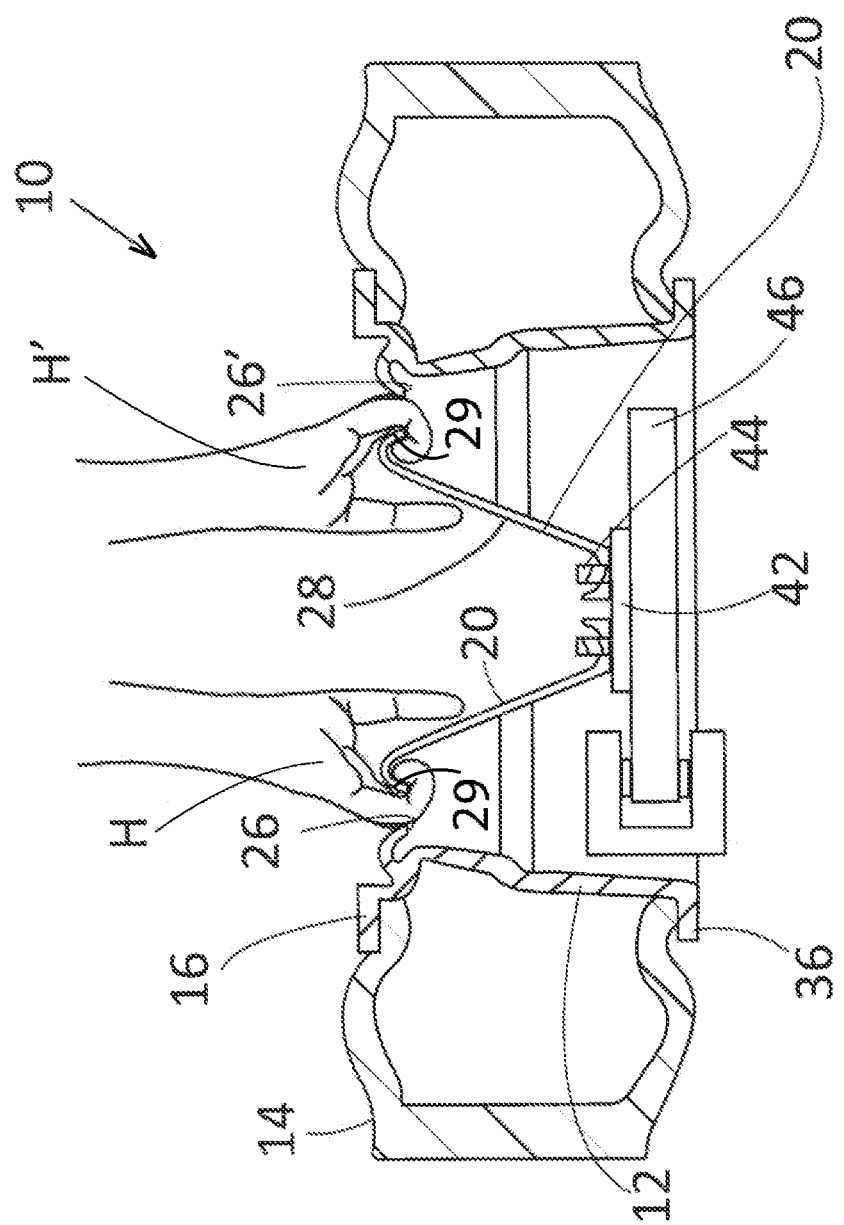
FIG. 3 is a view similar to that of FIG. 2 but showing the spare wheel assembly of the disclosed inventive concept in position on the hub of a vehicle.

Referring to FIG. 2, the space-saving spare wheel assembly 10 and the spare wheel well 30 are shown in cross-section. The spare wheel well 30 conventionally includes a base wall 32 and an enclosing side wall 34. A cover (not shown) is conventionally fitted over the space-saving spare wheel assembly 10 when in position within the spare wheel well 30.

As noted above, the rim 12 includes both the outer flange 16 and an opposed inner flange 36. The rim width defined by the outer flange 16 and the inner flange 36 that is illustrated are suggestive and may be varied depending on the type of tire used.

A centerline 38 is formed radially through the tire 14 and the rim 12. To maximize the best ergonomic arrangement for the operator, the area of the disk 20 of the rim 12 in which the curved handles 26 and 26' are formed is elevated relative to the outer flange 16. The disk has an arcuate projection 29 extending inwardly at each curved handle 26 and 26' toward the center mounting plate. According to this arrangement, the fingers of the operator's hands, illustrated as H and H', can easily and comfortably fit into the curved handles 26 and 26'.

Used preferably as a spare wheel assembly, the space-saving spare wheel assembly 10 must also be readily adaptable for use on a conventional vehicle hub for limited driving. Accordingly, the hub mounting plate 18 is deeply positioned in the rim 12 relative to the disk 20 whereby the conical area 28, formed between the hub mounting plate 18 and the disk 20, defines a deep inset 40 between the disk 20 and the hub mounting plate 18. As illustrated, the disk 20 is positioned on one side of the centerline 38 and the hub mounting plate 18 is positioned on the other side of the centerline 38.

The deep positioning of the mounting plate 18 relative to the disk 20 also provides additional ergonomic comfort to the user when the fingers of the hands H and H' are inserted into the curved handles 26 and 26'. Particularly, and as also shown in FIG. 2, to handle the space-saving spare wheel assembly 10, the fingers of the operator's hands H and H' are inserted into the curved handles 26 and 26'. The thumbs of the operator's hands H and H' are readily pressed against the conical area 28, thereby providing the necessary leverage to allow the user to remove the space-saving spare wheel assembly 10.

Once the space-saving spare wheel assembly 10 has been removed from the spare wheel well 30 by the operator by grasping the curved handles 26 and 26, the operator then places the wheel assembly 10 on a wheel hub 42 of the vehicle. The wheel hub 42 conventionally includes a plurality of lug bolts 44. A brake rotor 46 is fitted to the wheel hub 42 as is known.

Once the space-saving spare wheel assembly 10 is in position on the wheel hub 42, the operator fixes the wheel assembly to the hub 42 by use of lug nuts (not shown). Thus the ergonomic design of the curved handles 26 and 26 allows the operator to easily and comfortably remove the space-saving spare wheel assembly 10 from the wheel well 30 and attach it to the wheel hub 42 with a minimum amount of effort and with a maximum amount of safety.

Accordingly, based on the disclosed inventive concept as illustrated in the figures and as described above, it is to be understood that the disclosed the space-saving spare wheel assembly overcomes the challenges faced by known spare wheel assemblies by providing convenient and easy-to-use ergonomically designed handles that allow virtually any operator to easily remove the spare wheel assembly from the wheel well and attach it to the wheel hub. Removal of the spare wheel assembly from the wheel hub can also be readily accomplished by the disclosed design. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A spare wheel assembly for use with a vehicle, the assembly comprising:
    a tire; and
    a rim to which said tire is attached, said rim including a center mounting plate having a center bore, inner and outer opposed flanges, and a disk positioned between said center mounting plate and said flanges, said disk having a pair of elongated slots formed on opposite sides of said center bore, each of said slots being a hand hold for receiving fingers of a hand, said disk having an arcuate projection extending inwardly at each of said elongated slots toward said center mounting plate, said disk including a conical area extending between each of said elongated slots and said center mounting plate, and wherein said rim is integrally formed as a single piece unitary structure.

2. The spare wheel assembly of claim 1 wherein each of said elongated slots is curved.

3. The spare wheel assembly of claim 1 wherein said flanges define perimeters of said rim between which said tire is held.

4. The spare wheel assembly of claim 3 wherein said elongated slots are formed adjacent said outer flange.

5. The spare wheel assembly of claim 4 wherein said elongated slots are curved and equally spaced apart from rim.

6. The spare wheel assembly of claim 1 further including a centerline formed radially through said tire and said rim, said disk being partially on one side of said centerline and said center mounting plate being on the other side of said centerline.

7. The spare wheel assembly of claim 1 wherein said elongated slots are equally spaced apart from said center bore.

8. A spare wheel assembly comprising:
    a tire;
    a rim to which said tire is attached, said rim having a center mounting plate, inner and outer opposed flanges, and a disk positioned between said center mounting plate and said flanges, said disk having a pair of opposed elongated slots, each elongated slot being suitable for a hand to grasp, said disk having an arcuate projection extending inwardly at each of said elongated slots toward said center mounting plate, said disk including a conical area extending between each of said elongated slots and said center mounting plate; and
    a centerline formed radially through said tire and said rim, said disk being partially on one side of said centerline and said plate being on the other side of said centerline, and wherein said rim is integrally formed as a single piece unitary structure.

9. The spare wheel assembly of claim 8 wherein each of said elongated slots is curved.

10. The spare wheel assembly of claim 8 wherein said flanges define perimeters of said rim between which said tire is held.

11. The spare wheel assembly of claim 10 wherein said elongated slots are formed adjacent said outer flange.

12. The spare wheel assembly of claim 11 wherein said elongated slots are equally spaced apart from rim.

13. The spare wheel assembly of claim 8 wherein said center mounting plate includes a center bore and wherein said elongated slots are equally spaced apart from said center bore.

14. A spare wheel assembly comprising:
    a tire; and
    a rim to which said tire is attached, said rim having a center bore formed in a center mounting plate, inner and outer opposed flanges, and a disk positioned between said center mounting plate and said flanges, said disk having a pair of curved slots formed on opposite sides of said center bore, each of said curved slots being a hand hold for receiving a hand, said disk having an arcuate projection extending inwardly at each of said curved slots toward said center mounting plate, said curved slots being equally spaced apart from said center bore, said disk including a conical area extending between each of said curved slots and said center mounting plate, and wherein said rim is integrally formed as a single piece unitary structure.

15. The spare wheel assembly of claim 14 wherein each of said curved slots is elongated.

16. The spare wheel assembly of claim 14 wherein said flanges define perimeters of said rim between which said tire is held.

17. The spare wheel assembly of claim 16 wherein said curved slots are formed adjacent said outer flange.

18. The spare wheel assembly of claim 17 wherein said slots are equally spaced apart from said rim.

19. The spare wheel assembly of claim 14 further including a centerline formed radially through said tire and said rim, said disk being partially on one side of said centerline and said center mounting plate being on the other side of said centerline.

20. The spare wheel assembly of claim 14 wherein said center mounting plate includes a plurality of lug bolt holes formed therein.

* * * * *